(12) United States Patent
Bergen (10) Patent No.: US 9,243,805 B2
(45) Date of Patent: Jan. 26, 2016

(54) TOROIDAL COMBUSTION CHAMBER

(71) Applicant: Power Generation Technologies Development Fund, L P, Naperville, IL (US)

(72) Inventor: Ernst Bergen, Winnipeg (CA)

(73) Assignee: POWER GENERATION TECHNOLOGIES DEVELOPMENT FUND, L.P., Lemont, IL (US)

( * ) Notice: Subject to any disclaimer, the term of this patent is extended or adjusted under 35 U.S.C. 154(b) by 0 days.

(21) Appl. No.: 14/455,866

(22) Filed: Aug. 8, 2014

(65) Prior Publication Data

US 2014/0345291 A1 Nov. 27, 2014

Related U.S. Application Data

(63) Continuation of application No. 12/608,269, filed on Oct. 29, 2009, now Pat. No. 8,863,530.

(60) Provisional application No. 61/109,660, filed on Oct. 30, 2008.

(51) Int. Cl.
| | |
|---|---|
| F23R 3/52 | (2006.01) |
| F23R 3/28 | (2006.01) |
| F23R 3/04 | (2006.01) |
| F03B 5/00 | (2006.01) |
| F01D 1/34 | (2006.01) |
| F01D 1/36 | (2006.01) |

(Continued)

(52) U.S. Cl.
CPC ... *F23R 3/52* (2013.01); *F01D 1/36* (2013.01); *F02C 3/165* (2013.01); *F02K 7/005* (2013.01); *F03B 5/00* (2013.01); *F23R 3/04* (2013.01); *F23R 3/28* (2013.01); *F01D 1/34* (2013.01)

(58) Field of Classification Search
CPC ............... F23R 3/50; F23R 3/52; F23R 3/28; F23R 3/04; F01D 1/04; F01D 1/06; F01D 1/34; F01D 1/36; F03B 5/00
USPC ............. 60/39.01, 39.12, 804, 805, 755, 746, 60/743; 415/80–82, 84, 90, 115, 120; 416/91, 175, 197 R, 203
See application file for complete search history.

(56) References Cited

U.S. PATENT DOCUMENTS

| | | | |
|---|---|---|---|
| 1,061,206 A | 5/1913 | Tesla | |
| 2,739,782 A * | 3/1956 | White | ............................. 415/17 |

(Continued)

FOREIGN PATENT DOCUMENTS

| | | |
|---|---|---|
| CN | 1187232 A | 7/1998 |
| DE | 102006051063 | 2/2007 |

(Continued)

OTHER PUBLICATIONS

Accuratus "Accuratus Materials" Jan. 18, 2007 https://web.archive.org/web/20070118183832/http://www.accuratus.com/zirc.html.*

(Continued)

*Primary Examiner* — Phutthiwat Wongwian
*Assistant Examiner* — William Breazeal
(74) *Attorney, Agent, or Firm* — Locke Lord LLP (57) ABSTRACT

A device comprising a combustion toroid for receiving combustion-induced centrifugal forces therein to continuously combust fluids located therein and an outlet for exhaust from said combustion toroid.

71 Claims, 7 Drawing Sheets

(51) Int. Cl.
*F02C 3/16* (2006.01)
*F02K 7/00* (2006.01)

(56) References Cited

U.S. PATENT DOCUMENTS

| | | | |
|---|---|---|---|
| 3,007,311 A | 11/1961 | Amero | |
| 3,045,428 A * | 7/1962 | McLean | 60/805 |
| 3,309,866 A | 3/1967 | Kydd | |
| 3,688,496 A | 9/1972 | Sorensen | |
| 3,751,908 A | 8/1973 | Colwell et al. | |
| 3,831,854 A | 8/1974 | Sato et al. | |
| 3,899,875 A | 8/1975 | Oklejas et al. | |
| 3,990,228 A | 11/1976 | Bailey et al. | |
| 3,999,377 A | 12/1976 | Oklejas et al. | |
| 4,010,018 A | 3/1977 | Kantor | |
| 4,018,043 A | 4/1977 | Clemmens | |
| 4,036,584 A | 7/1977 | Glass | |
| 4,043,393 A | 8/1977 | Fisher et al. | |
| 4,078,529 A | 3/1978 | Warwick | |
| 4,084,371 A | 4/1978 | Howald | |
| 4,109,549 A | 8/1978 | Vincent | |
| 4,116,273 A | 9/1978 | Fisher et al. | |
| 4,127,453 A | 11/1978 | Radebold | |
| 4,136,530 A | 1/1979 | Kantor | |
| 4,151,709 A * | 5/1979 | Melconian et al. | 60/804 |
| 4,186,554 A | 2/1980 | Possell | |
| 4,197,700 A | 4/1980 | Jahnig | |
| 4,201,512 A | 5/1980 | Marynowski et al. | |
| 4,229,938 A | 10/1980 | Gallagher | |
| 4,236,490 A | 12/1980 | Correll | |
| 4,241,576 A | 12/1980 | Gertz | |
| 4,334,841 A | 6/1982 | Barlow | |
| 4,347,698 A | 9/1982 | Nelson | |
| 4,357,794 A | 11/1982 | Nelson | |
| 4,367,639 A | 1/1983 | Kantor | |
| 4,375,150 A | 3/1983 | Nikiforakis | |
| 4,381,462 A | 4/1983 | Radebold | |
| 4,441,337 A | 4/1984 | Kantor | |
| 4,524,587 A | 6/1985 | Kantor | |
| 4,534,699 A | 8/1985 | Possell | |
| 4,563,875 A | 1/1986 | Howald | |
| 4,564,490 A * | 1/1986 | Omori et al. | 264/682 |
| 4,586,328 A | 5/1986 | Howald | |
| 4,590,761 A | 5/1986 | Zettner | |
| 4,620,414 A | 11/1986 | Christ | |
| 4,741,154 A | 5/1988 | Eidelman | |
| 4,795,113 A | 1/1989 | Minovitch | |
| 4,825,521 A | 5/1989 | Frotschner et al. | |
| 4,835,960 A | 6/1989 | Skoczkowski et al. | |
| 4,843,823 A | 7/1989 | Freedman | |
| 4,912,923 A | 4/1990 | Lin | |
| 4,916,905 A | 4/1990 | Havercroft et al. | |
| 5,065,073 A | 11/1991 | Frus | |
| 5,090,198 A | 2/1992 | Nightingale et al. | |
| 5,109,671 A | 5/1992 | Haasis | |
| 5,111,655 A * | 5/1992 | Shekleton | 60/804 |
| 5,138,831 A | 8/1992 | Cowan, Sr. | |
| 5,148,084 A | 9/1992 | Frus | |
| 5,161,368 A | 11/1992 | Pomerleau | |
| 5,237,814 A | 8/1993 | Chen | |
| 5,245,252 A | 9/1993 | Frus et al. | |
| 5,263,313 A | 11/1993 | Chow | |
| 5,279,110 A | 1/1994 | Lin | |
| 5,309,718 A | 5/1994 | Loving | |
| 5,384,051 A | 1/1995 | McGinness | |
| 5,399,942 A | 3/1995 | Frus | |
| 5,404,868 A | 4/1995 | Sankrithi | |
| RE34,962 E * | 6/1995 | Shekleton | 60/39.36 |
| 5,474,043 A | 12/1995 | Mallen | |
| 5,501,070 A | 3/1996 | Lin | |
| 5,558,783 A | 9/1996 | McGuinness | |
| 5,561,350 A | 10/1996 | Frus et al. | |
| 5,709,076 A | 1/1998 | Lawlor | |
| 5,839,270 A | 11/1998 | Jirnov et al. | |
| 5,864,221 A | 1/1999 | Downs et al. | |
| 5,885,057 A | 3/1999 | Wootten | |
| 5,960,625 A | 10/1999 | Zdvorak, Sr. | |
| 6,192,669 B1 | 2/2001 | Keller et al. | |
| 6,247,472 B1 | 6/2001 | Moseley | |
| 6,257,195 B1 | 7/2001 | Van Moor | |
| 6,272,863 B1 * | 8/2001 | Pfefferle et al. | 60/723 |
| 6,273,673 B1 | 8/2001 | Wootten | |
| 6,298,821 B1 | 10/2001 | Bolonkin | |
| 6,334,299 B1 | 1/2002 | Lawlor | |
| 6,341,590 B1 | 1/2002 | Barrera et al. | |
| 6,375,412 B1 | 4/2002 | Dial | |
| 6,503,067 B2 | 1/2003 | Palumbo | |
| 6,510,683 B1 | 1/2003 | Lawlor | |
| 6,534,551 B2 | 3/2003 | Allam et al. | |
| 6,535,096 B1 | 3/2003 | Rapoport et al. | |
| 6,608,543 B2 | 8/2003 | Rapoport et al. | |
| 6,692,232 B1 | 2/2004 | Letourneau | |
| 6,726,443 B2 | 4/2004 | Collins et al. | |
| 6,779,964 B2 | 8/2004 | Dial | |
| 6,796,123 B2 | 9/2004 | Lasker | |
| 6,854,437 B1 | 2/2005 | Vazquez | |
| 6,897,832 B2 | 5/2005 | Essig, Jr. et al. | |
| 6,973,792 B2 | 12/2005 | Hicks | |
| 6,983,604 B1 | 1/2006 | Tafoya | |
| 7,062,900 B1 | 6/2006 | Brun | |
| 7,100,370 B2 | 9/2006 | Klement et al. | |
| 7,117,827 B1 | 10/2006 | Hinderks | |
| 7,127,897 B2 | 10/2006 | Carrea | |
| 7,168,949 B2 | 1/2007 | Zinn et al. | |
| 7,180,216 B2 | 2/2007 | Hirzel et al. | |
| 7,192,244 B2 | 3/2007 | Grande, III et al. | |
| 7,237,385 B2 | 7/2007 | Carrea | |
| 7,318,317 B2 | 1/2008 | Carrea | |
| 7,337,606 B2 | 3/2008 | Brouillette et al. | |
| 7,341,424 B2 | 3/2008 | Dial | |
| 7,372,185 B2 | 5/2008 | Hirzel | |
| 7,382,332 B2 | 6/2008 | Essig, Jr. et al. | |
| 7,390,163 B2 * | 6/2008 | Clauson | 415/83 |
| 7,404,286 B2 | 7/2008 | Lior | |
| 7,438,027 B1 | 10/2008 | Hinderks | |
| 7,497,012 B2 | 3/2009 | Procin et al. | |
| 7,533,719 B2 | 5/2009 | Hinson et al. | |
| 7,540,324 B2 | 6/2009 | deRouffignac et al. | |
| 7,559,701 B2 | 7/2009 | Knobloch et al. | |
| 7,562,707 B2 | 7/2009 | Miller | |
| 7,591,129 B2 | 9/2009 | Worrell | |
| 2002/0000085 A1 | 1/2002 | Hall et al. | |
| 2002/0195886 A1 * | 12/2002 | Collins et al. | 310/52 |
| 2003/0048165 A1 | 3/2003 | Rapoport et al. | |
| 2003/0053909 A1 | 3/2003 | O'Hearen | |
| 2003/0074883 A1 | 4/2003 | Cirrito et al. | |
| 2004/0000145 A1 | 1/2004 | Leyva et al. | |
| 2004/0154321 A1 | 8/2004 | Carrea | |
| 2005/0044842 A1 * | 3/2005 | Dinu | 60/39.11 |
| 2005/0103329 A1 | 5/2005 | Essig et al. | |
| 2005/0109671 A1 | 5/2005 | Ketley et al. | |
| 2005/0126171 A1 | 6/2005 | Lasker | |
| 2005/0126755 A1 | 6/2005 | Berry et al. | |
| 2005/0169743 A1 | 8/2005 | Hicks | |
| 2005/0180845 A1 | 8/2005 | Vreeke et al. | |
| 2005/0214109 A1 | 9/2005 | Grande et al. | |
| 2005/0241315 A1 | 11/2005 | Schlote | |
| 2005/0276681 A1 | 12/2005 | Avina | |
| 2005/0284127 A1 | 12/2005 | Tobita et al. | |
| 2006/0029894 A1 | 2/2006 | Zinn et al. | |
| 2006/0078436 A1 | 4/2006 | Neeb et al. | |
| 2006/0088138 A1 | 4/2006 | Jouanneau | |
| 2006/0131978 A1 | 6/2006 | Hirzel et al. | |
| 2006/0216149 A1 | 9/2006 | Wilson | |
| 2006/0236701 A1 | 10/2006 | Carrea | |
| 2007/0131182 A1 | 6/2007 | Mirabile | |
| 2007/0137220 A1 | 6/2007 | Carrea | |
| 2007/0145856 A1 | 6/2007 | Hirzel et al. | |
| 2007/0151227 A1 | 7/2007 | Worrell | |
| 2007/0284108 A1 | 12/2007 | Roes et al. | |
| 2007/0289733 A1 | 12/2007 | Hinson et al. | |
| 2007/0297904 A1 | 12/2007 | Hoeger | |
| 2008/0017380 A1 | 1/2008 | Vinegar et al. | |
| 2008/0035346 A1 | 2/2008 | Nair et al. | |

(56) References Cited

U.S. PATENT DOCUMENTS

| | | |
|---|---|---|
| 2008/0035347 A1 | 2/2008 | Brady et al. |
| 2008/0035348 A1 | 2/2008 | Vitek |
| 2008/0035705 A1 | 2/2008 | Menotti |
| 2008/0038144 A1 | 2/2008 | Maziasz et al. |
| 2008/0128134 A1 | 6/2008 | Mudunuri et al. |
| 2008/0135244 A1 | 6/2008 | Miller |
| 2008/0135253 A1 | 6/2008 | Vinegar et al. |
| 2008/0135254 A1 | 6/2008 | Vinegar et al. |
| 2008/0141921 A1 | 6/2008 | Hinderks |
| 2008/0142216 A1 | 6/2008 | Vinegar et al. |
| 2008/0142217 A1 | 6/2008 | Pieterson et al. |
| 2008/0173442 A1 | 7/2008 | Vinegar et al. |
| 2008/0173444 A1 | 7/2008 | Stone |
| 2008/0173449 A1 | 7/2008 | Fowler |
| 2008/0173450 A1 | 7/2008 | Goldberg et al. |
| 2008/0174115 A1 | 7/2008 | Lambirth |
| 2008/0185147 A1 | 8/2008 | Vinegar et al. |
| 2008/0217003 A1 | 9/2008 | Kuhlman et al. |
| 2008/0217004 A1 | 9/2008 | de Rouffignac |
| 2008/0217015 A1 | 9/2008 | Vinegar et al. |
| 2008/0217016 A1 | 9/2008 | Stegemeier et al. |
| 2008/0232745 A1 | 9/2008 | Knobloch et al. |
| 2008/0236132 A1 | 10/2008 | Molnar |
| 2008/0236831 A1 | 10/2008 | Hsu |
| 2008/0276622 A1 | 11/2008 | Johnson et al. |
| 2008/0277113 A1 | 11/2008 | Stegemeier et al. |
| 2008/0283246 A1 | 11/2008 | Karanikas et al. |
| 2008/0304974 A1 | 12/2008 | Marshall et al. |
| 2009/0013694 A1 | 1/2009 | Hernandez et al. |
| 2009/0014180 A1 | 1/2009 | Stegemeier et al. |
| 2009/0014181 A1 | 1/2009 | Vinegar et al. |
| 2009/0071652 A1 | 3/2009 | Vinegar |
| 2009/0090158 A1 | 4/2009 | Davidson et al. |
| 2009/0090509 A1 | 4/2009 | Vinegar et al. |
| 2009/0095476 A1 | 4/2009 | Nguyen et al. |
| 2009/0095479 A1 | 4/2009 | Karanikas et al. |

FOREIGN PATENT DOCUMENTS

| | | |
|---|---|---|
| DE | 102005039024 | 5/2008 |
| GB | 137550 A | 1/1920 |
| GB | 186082 | 9/1922 |
| GB | 753561 | 7/1956 |
| GB | 847359 A | 9/1960 |
| GB | 1150226 | 4/1969 |
| GB | 1416011 A | 12/1975 |
| GB | 2451704 A | 2/2009 |
| JP | 42-18488 B | 3/1965 |
| JP | 033858 C | 11/1971 |
| JP | 06-058543 A | 3/1994 |
| JP | 08-121101 A | 5/1996 |
| JP | 101144 B | 1/1998 |
| RU | 2124746 C1 | 1/1999 |
| RU | 2343296 C1 | 1/2009 |
| WO | WO8806226 A1 | 8/1988 |
| WO | 96/41073 A | 12/1996 |
| WO | WO0242642 A1 | 5/2002 |
| WO | WO2009022103 A2 | 2/2009 |

OTHER PUBLICATIONS

1st Office Action in corresponding Russian Application No. 2011116885/06(025036) (English and Russian language).
Office Action in corresponding Japanese Application No. 2011-534736 (English and Japanese language).
Office Action in corresponding Chinese Application No. 2013062601094320. (English and Chinese language).
Aa Russian Office Action issued in corresponding Russian Application No. 2011116885/06 dated Dec. 15, 2014, including Decision Grant and The Examiner's Report with English Translation.
A Japanese Office Action issued in corresponding foreign Application No. 2011-534736, with English translation, Jan. 6, 2016.
International Search Report for co-pending PCT application No. PCT/US2009/062479, mailed on Dec. 22, 2009.
PCT Written Opinion of the International Searching Authority for co-pending PCT International Application No. PCT/US2009/062479, Dec. 22, 2009.
Second Chinese Office Action Filing No. 200980142490.6 (with English Translation), Jan. 20, 2014.
Second Russian Office Action Filing No. 2011116885 (with English translation), Mar. 24, 2014.
Third Office Action in corresponding Chinese Application No. 200980142490.6 with English Translation, Jul. 9, 2014.
Chinese Reference No. CN 1858498 A with English Abstract, May 16, 2015.
Office Action in corresponding Japanese Application No. 2011-534736 with English translation, Jun. 20, 2014.
Jul. 17, 2015—Korean Office Action Notice of Preliminary Rejection—Application No. 10-2011-7011768 (with English Translation).
Nov. 17, 2015 Canadian Office Action in Canadian Patent Application No. 2,739,808.

* cited by examiner

TOROIDAL COMBUSTION CHAMBER

This application is a continuation of U.S. patent application Ser. No. 12/608,269, filed Oct. 29, 2009, which claims the benefit of the filing date of U.S. provisional patent application Ser. No. 61/109,660, filed on Oct. 30, 2008, the disclosures of each of the aforementioned applications being incorporated herein by reference.

FIELD OF THE INVENTION

Disclosed are embodiments of the invention which relate to, among other things, turbines and methods of generating power.

BACKGROUND

Prior art turbines and generators utilizing boundary layer effects to generate power, for example, those disclosed in U.S. Pat. Nos. 1,061,206 to Tesla and 7,341,424 to Dial, suffer from limited power output and efficiency.

Prior art turbines and generators relying on the teachings of Tesla have failed to take advantage of the simplicity of the Tesla design to generate maximized power output and there exists a need in the art for improved turbines and power generators.

SUMMARY OF THE INVENTION

By providing a combustion chamber extending about the circumference of the disc pack, a relatively simple construction permits considerable efficiency and power output. The configuration permits air and fuel to be mixed directly about the combustion chamber to ensure complete combustion of the fuel. This permits air and fuel to be mixed at a plurality of locations circumferentially about the chamber for increasing the power output by permitting more fuel to be consumed in an efficient manner and by imparting more rotational movement to the products of combustion.

By providing air and fuel tangentially into the combustion chamber, the combustion of the fuel can be contained about the outer periphery of the combustion chamber by the centrifugal forces imparted onto the fuel and air rotating about the combustion chamber. The centrifugal forces ensure that products of combustion are substantially fully reacted before overcoming the centrifugal force and outward pressure from the disc pack prior to being exhausted for optimal use of fuel.

By capturing air external to the turbine and allowing it to descend substantially rotationally through the thickness formed between the air inlet and combustion chamber, air may be provided about the outer periphery of the combustion chamber in a manner that is perpendicular to its origin direction, emulating the rotating flows in the combustion chamber.

BRIEF DESCRIPTION OF THE DRAWINGS

In the drawings like characters of reference indicate corresponding parts in the different figures.

DETAILED DESCRIPTION

Figure 1:
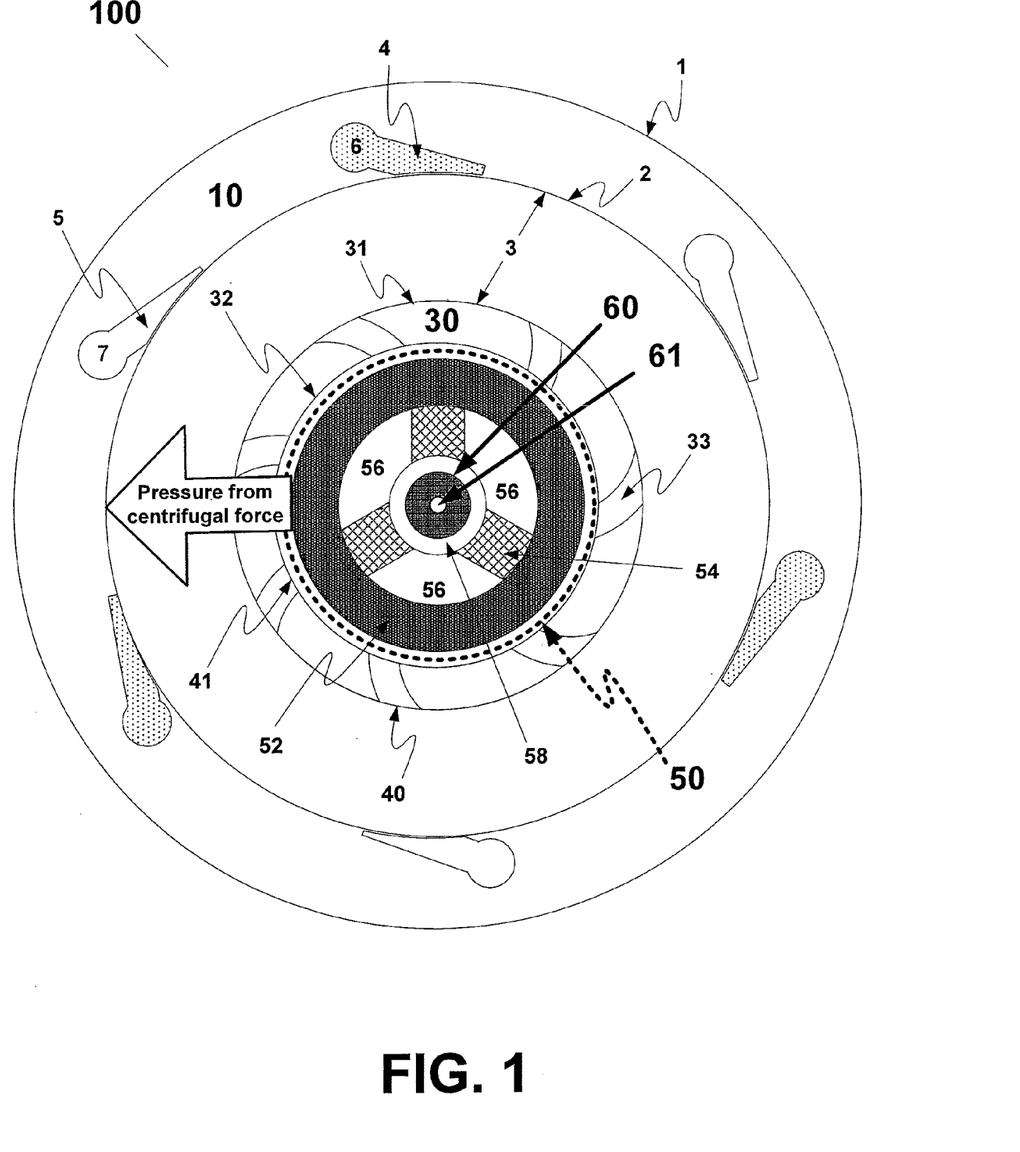
FIG. 1 illustrates a combustion turbine according to an exemplary embodiment of the present invention.

FIG. 1 illustrates a turbine 100, which may comprise a combustion housing 10, nozzle ring 30 and a disc pack 50. Disc pack 50 holds a drive shaft 60, such that the drive shaft 60 experiences the rotation of the disc pack 50. Disc pack 50 transfers power output from within turbine 100 to another device (for example, a generator or pump) via drive shaft 60. A turbine axis 61 is located at the geometric center of the face of drive shaft 60. The turbine axis longitudinally runs along the shaft 60.

Combustion housing 10 carries within itself a combustion chamber 3 located about the turbine axis 61 and through which combusted fluid travels to generate power via shaft 60. The combustion housing 10 has an outside surface 1 and an inside surface 2. According to an exemplary embodiment of the present invention, combustion housing 10 may be made or designed through known machining and/or molding processes with any material that can withstand high heat stresses and thermal shock, for example, but not limited to, alumina, graphite, silicon carbide (SiC), etc. Alternatively, this exemplary embodiment of the present invention may be made or designed through known machining and/or molding processes with stainless steel for smaller applications. Those skilled in the art will recognize, however, that material used to form combustion housing 10 of turbine 100 is not critical to the present invention and may include any material or composites thereof, which serve the objectives enumerated in the various embodiments according to the present invention.

According to the exemplary embodiment of the present invention illustrated in FIG. 1, inside surface 2 may substantially enclose combustion chamber 3. In another exemplary embodiment of the present invention, inside surface 2 may create a toroidal combustion chamber 3. In yet another exemplary embodiment, inside surface 2 may create a toroidal combustion chamber 3 whose cross section is substantially round (e.g., circular or elliptical or any other shape with rounded edges). In another exemplary embodiment, inside surface 2 may enclose nozzle ring 30, disc pack 50 and/or drive shaft 60. According to another exemplary embodiment of the present invention, inside surface 2 may come into substantial contact with the interior portions of turbine 100. Those skilled in the art would also recognize that those components that may be within combustion housing 10 may come into substantial contact with the inside surface 2 of combustion housing 10.

Figure 2:
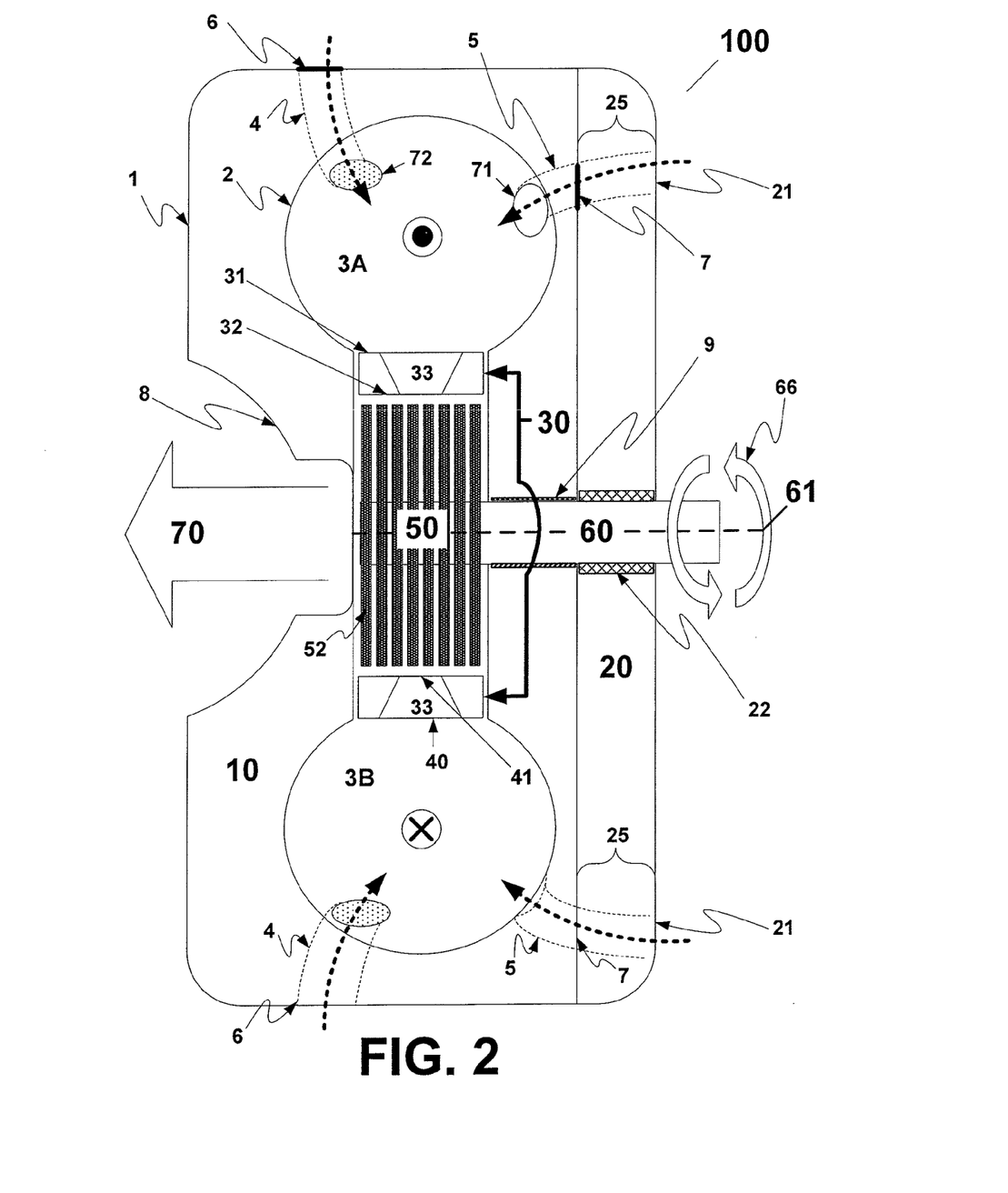
FIG. 2 illustrates a profile view of a combustion turbine according to an exemplary embodiment of the present invention.

The combustion housing 10 contains openings 6 and 7 disposed within the combustion housing wall defined by surfaces 1 and 2. Fuel and air may flow through openings 6 and 7 into channels 4 and 5 respectively. In one exemplary embodiment of the present invention, fuel channel 4 and air channel 5 may be placed in any organization located about combustion housing 10 providing fuel and air from within the combustion housing wall into the combustion chamber 3. According to an exemplary embodiment of the present invention depicted in FIG. 1, the fuel and air channels 4 and 5 may be located circumferentially about the turbine axis 61. In a further exemplary embodiment of the present invention in FIG. 1, the fuel and air channels 4 and 5 may alternate in their placement about the circumference of combustion housing 10. Those skilled in the art may recognize numerous other alternative organizations of fuel and air channels 4 and 5 about the combustion housing 10 and combustion chamber 3 depending on the desired operation of turbine 100. In the exemplary embodiment of the present invention according to FIG. 1, fuel and air channels 4 and 5 may provide their respective fluids in flow patterns which aid combustion of the mixture in combustion chamber 3. Alternatively, the fuel and air channels 4 and 5 may provide their respective fluids in flow patterns which ultimately will increase the power translated to drive shaft 60 from those fluids' interaction with disc pack 50.

Further description of combustion housing 10 and combustion chamber 3 will be made with reference to FIG. 2.

Referring back to FIG. 1, in one exemplary embodiment of the present invention, the nozzle ring 30 is disposed between combustion chamber 3 and disc pack 50. Nozzle ring 30 is formed of a distal surface 31, a proximal surface 32 and a plurality of combustion fluid ("CF") nozzles 33. Each CF nozzle 33 is formed between a distal space 40 and a proximal space 41. Distal surface 31 substantially encloses the remaining portions of combustion chamber 3 not enclosed by inner surface 2. Those portions of combustion chamber 3 not enclosed by either inner surface 2 or distal surface 31 may provide combustion fluid through any one of the plurality of CF nozzles 33 through their respective distal spaces 40. In an exemplary embodiment according to the present invention, the combustion fluid from combustion chamber 3 enters any one of the plurality of CF nozzles 33 at their respective distal spaces 40 and exits via their respective proximal spaces 41.

In an exemplary embodiment according to the present invention, nozzle ring 30 may be integrated with combustion housing 10 to substantially form a surface encompassing combustion chamber 3. According to this embodiment, a surface encompassing combustion chamber 3 may comprise inner surface 2, distal surface 31, and the walls defining CF nozzle 33. According to this exemplary embodiment, passage of fluid from combustion chamber 3 to disc pack 50 may be achieved through any number of the plurality of CF nozzles 33.

In another embodiment according to the present invention, nozzle ring 30 is a distinct component of turbine 100, separate and apart from combustion housing 10. Those skilled in the art will recognize that integration of nozzle ring 30 with combustion housing 10 can affect the same combustion chamber 3 characterization described above. Further, those skilled in the art will also recognize that separation of nozzle ring 30 from combustion housing 10 will not result in substantial deviation from the objectives of the various embodiments of the present invention enumerated herein.

According to an exemplary embodiment of the present invention, nozzle ring 30 may be designed of any material that withstands high heat stress and thermal shock, for example, SiC, stainless steel, etc. The material selected according to this particular embodiment of the present invention makes the nozzle ring 30 especially suitable for obtaining high temperatures and allowing combustion fluid coming in contact therewith to further combust.

According to an exemplary embodiment of the present invention illustrated in FIG. 1, disc pack 50 resides within nozzle ring 30. Disc pack 50 contains a plurality of discs 52 of such diameter and thickness and between-disc spacing that when rotated by and within a fluid, a boundary layer effect allows further fluid to move through disc pack 50 to cause rotation of disk pack 50. The spacing between plates typically is selected to be directly proportional to fluid viscosity to achieve the desired boundary layer effect. Each disc 52 may be connected to a shaft mount 58 by a plurality of spokes 54. Alternatively, the disc pack 50 may be attached to the drive shaft 60 by a plurality of spokes 54. According to an exemplary embodiment of the present invention, rotation of disc pack 50 may rotate drive shaft 60 about turbine axis 61 creating power. According to another exemplary embodiment of the present invention, combustion fluid flows through the disc pack 50 over any number of the plurality of discs 52 thereby driving drive shaft 60 in the direction of the combustion fluid flow. The drive shaft 60 may be integrally attached to disc pack 50 at shaft mount 58. In another embodiment according to the present invention, disc pack 50 may use shaft mount 58 to relate the rotation caused by the combustion fluid through its discs 52 to drive shaft 60.

Figure 3:
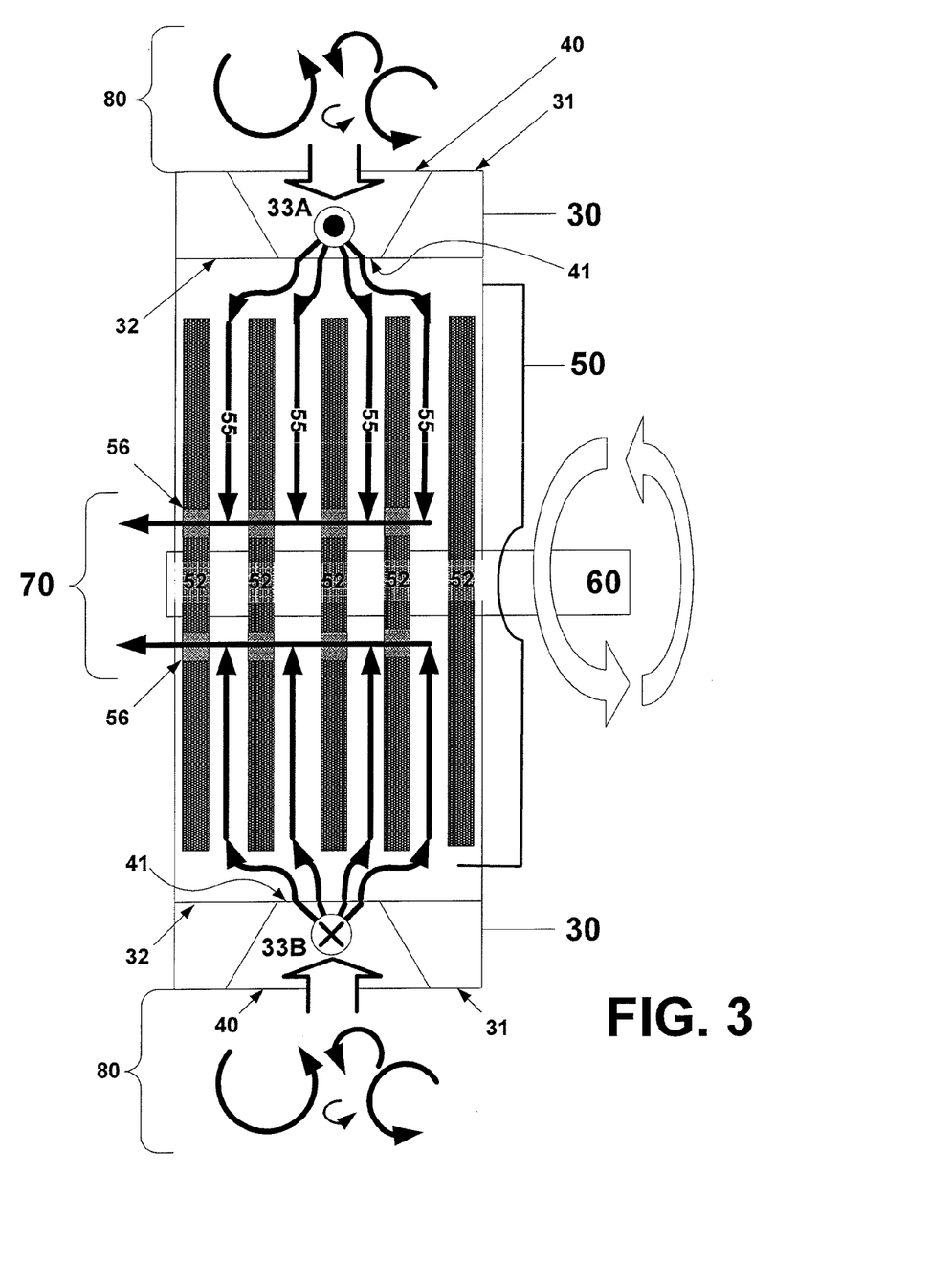
FIG. 3 illustrates a profile view of a nozzle ring and a disc pack according to an exemplary embodiment of the present invention.

According to the embodiment of the present invention illustrated in FIGS. 1-3, exhaust 70 (depicted in the exemplary embodiments of the present invention illustrated by FIGS. 2 and 3), leaves the disc pack 50 in a direction along the turbine axis longitudinally through any one of the plurality of disc pack exits 56 formed from the arrangement of the spokes 54 of disc pack 50. According to an embodiment of the present invention, exhaust 70 exiting turbine 100 at turbine exit 8 may be the product of a plurality of combustions taking place between the combustion fluid and the combustion chamber 3, nozzle ring 30 and disc pack 50. In another embodiment of the present invention, the exhaust 70 exiting the turbine 100 may be a product of the combustions occurring within combustion chamber 3 and any one of nozzle ring 30 and disc pack 50. In yet another embodiment of the present invention, exhaust 70 exiting turbine 100 through turbine exit 8 is produced as a result of substantially complete combustion of combustion fluid within chamber 3.

In another exemplary embodiment, combustion fluid within combustion chamber 3 may receive centrifugal forces through increased pressure created by the rotation of disc pack 50. According to one operation of this embodiment, the centrifugal forces generated by rotation of the disc pack 50 creates increased pressure beneath nozzle ring 30. The increased pressure beneath nozzle ring 30 may act on the combustion fluid within combustion chamber 3, allowing longer combustion of the combustion fluid within chamber 3. According to another operation of this embodiment, rotation of the disc pack 50 causes the combustion fluid in combustion chamber 3 to move distally from the turbine axis 61 towards inner surface 2 and/or the walls defining any number of the plurality of CF nozzles 33. This allows for further combustion of the combustion fluid within chamber 3 and/or within nozzle ring 30, achieving substantially reacted product within turbine 100. Following such reactions according to these embodiments of the present invention, the substantially reacted product exists from turbine 100 as exhaust 70.

With reference to the exemplary embodiments according to the present invention described above, the rotation of disc pack 50 may force combustion fluid into contact with the proximal surface 32 of nozzle ring 30 allowing for further combustion reactions of the combustion fluid located near and between edges of discs 52 and proximal surface 32.

FIG. 2 depicts an exemplary embodiment of the side view of turbine 100 according to the present invention. Within combustion housing 10, combustion chamber 3 is illustrated in two sections 3A and 3B. Within combustion chamber 3A is a circled symbol "•" while combustion chamber 3B contains a circled symbol "X". According to this and further illustrations of embodiments of the present invention, an encircled "•" symbolizes fluid flows out of the page while an encircled "X" symbolizes fluid flows into the page. Accordingly, combustion chamber sections 3A and 3B depict fluid flow in a counter clockwise direction (viewing turbine 100 from the side where drive shaft 60 protrudes through turbine 100) causing the same counter clockwise rotation 66 at drive shaft 60.

In the exemplary embodiment of the present invention depicted in FIG. 2, turbine 100 comprises combustion housing 10 enclosing nozzle ring 30, disc pack 50 and drive shaft 60 at combustion housing shaft aperture 9. Shaft aperture 9 may comprise any type of aperture enabling fluid rotation of shaft 60 within combustion housing 10 (e.g., ball bearings, magnetic bearings, lubricated surfaces, etc.). Those skilled in the art will recognize numerous ways in which aperture 9 may be designed and configured to permit consistent and uninhibited rotation of shaft 60 during turbine 100 operation.

The outputs of the inner workings within combustion housing 10 may exit turbine 100 via turbine exit 8. According to one embodiment of the present invention, turbine exit 8 may be adapted to connect to other devices for treatment and expulsion of exhaust gases 70 from turbine 100. In another embodiment, turbine exit 8 may be configured for controlled release of exhaust gases 70 from turbine 100. In yet another embodiment, the shape of turbine exit 8 may influence the vacuum effect generated at the flow points of exhaust gas 70.

FIG. 2 depicts an exemplary embodiment of the combustion fluid mixing in combustion chamber sections 3A and 3B according to the present invention. Referring first to combustion chamber section 3A, each of fuel and air channels 4 and 5, respectively, enter combustion chamber 3A via channel outlets 72 and 71, respectively. Channel outlet 71/72 may be any aperture in inner surface 2 of the combustion housing through which fluid from the respective channel may enter combustion chamber 3. According to this exemplary embodiment according to the present invention, dashed lines located in fuel channel 4 and air channel 5 illustrate the fluid flow of the fluid in each channel. Each channel 4 and 5 contains an opening 6 and 7, respectively, within the wall formed between surfaces 1 and 2 of chamber housing 10. Opening 6 of fuel channel 4 may allow for entry of fuel injectors or any other type of fuel providing apparatus/arrangement known to those skilled in the art. According to the exemplary embodiment of the present invention in FIG. 2, opening 7 of air channel 5 may allow for entry of air from outside the combustion housing 10 or outside any other type of combustion providing apparatus/arrangement known to those skilled in the art.

According to the embodiment of FIG. 2, combustion housing 10 may be coupled to air plate 20. Air plate 20 may provide an aperture 22 for reception and rotation of drive shaft 60 within the coupled configuration of combustion housing 10, disc pack 50 and air plate 20. According to one embodiment of the present invention, aperture 22 functions in like manner to aperture 9 of combustion housing 10. Alternatively, aperture 22 may utilize separate fluid external to air plate 20 to maintain consistent rotation of shaft 60 rotating therein.

Air plate 20 may receive air from a source external to turbine 100 through one or more air inlets 21. Each air inlet 21 may channel received air into one or more openings 7 of one or more air channels 5 through air nozzle 25. In this particular embodiment of the present invention, air plate 20 provides the air which is dispensed into combustion chamber 3 of combustion housing 10. In an alternative embodiment of the present invention, air plate 20 may be integrally formed with combustion housing 10. In another embodiment according to the present invention, air nozzle 25 may be seamlessly coupled to air channel 5 to create fluent air flow from air inlet 21 through outlet 71.

Fluent air flow through air channel 5 allows for smoother air flows with diminished turbulence in the fluid as it enters combustion chamber 3. In an exemplary embodiment of the present invention, centrifugal supplies of input air 75 (illustrated in the exemplary embodiment of the present invention in FIGS. 5B, 6 and 7B) about the surface of air plate 20 permits air inlet 21 to feed turbulent input air 75 into air nozzle 25 whose geometry works to reduce turbulence of the input air 75 to establish air flows out of outlet 71 of air channel 5 that are substantially tangential to input surface 2. In another embodiment of the present invention, the turbulence of input air 75 may be greatly reduced by the combined geometries of any one of air inlet 21, air nozzle 25, opening 7 of air channel 5 or outlet 71. Further discussion related to the turbulence reducing geometries of the aforementioned embodiments of the present invention will be had with reference to FIGS. 6 and 7A-B.

According to the exemplary embodiment of the present invention illustrated in FIG. 2, the flows of fuel and air from the openings 72 and 71 of their respective fuel and air channels 4 and 5 flow substantially tangential into combustion section 3A and then mix into a combustible fluid as they flow throughout the circumference of combustion chamber 3 from section 3A to 3B. The initial combustion of the combustible fluid in the combustion chamber 3 may be accomplished by means of ignition or heating from within the combustion housing 10. Those skilled in the art will recognize numerous ways by which combustible fluid may be initially ignited within combustion chamber 3.

As per another operation of an exemplary embodiment of the present invention, combustion housing 10 may achieve high enough temperatures to combust all combustible fluid therein and produce substantially reacted product before the combustion fluid exits the turbine 100. In such an operation, numerous continuous combustions of combustion fluid take place in combustion housing 10. Alternatively, combustion fluid experiences longer amounts of time exposed to combustion processes within combustion housing 10.

According to one embodiment of the present invention, the combustion chamber may use catalysts (e.g., surface coatings) to cause substantially complete combustion reactions in the combustion fluid. Alternatively, another embodiment may use the forces exerted by the operation of turbine 100 components to act as catalysts to cause substantially reacted products from the combustion fluid. According to these embodiments of the present invention, at high enough temperatures, portions of turbine 100 cease to combust combustion fluid and instead catalytically convert that combustion fluid into fully reacted product. In an exemplary embodiment, pressure in combustion chamber 3 during the combustion process compresses the combustion gases and contains the combustion flames about inner surface 2. The pressure in combustion chamber 3 may be achieved by the backpressure from the rotating discs 52 which behave like a centrifugal compressor. Alternatively, these pressures may be achieved from the centrifugal force of the spinning combustion gases in a vortex flow. As per the operation of this exemplary embodiment, back pressure and centrifugal forces act as catalysts to ensure substantially complete combustion of the fuel and the primary products of combustion before exiting through disc exits 56 and turbine exit 8 to ensure optimal efficiency of combustion in a simple construction which can be readily maintained.

According to one embodiment of the present invention, once an initial volume of combustible fluid is ignited, subsequent channeling of fuel and air into the combustion chamber 3 will result in continuous combustion of the mixed fluid flows. In this embodiment, the continuous provision of fuel and air via fuel and air channels 4 and 5, respectively, creates a continuous combustion vortex throughout chamber 3. The vortex flow of combustion fluid throughout chamber 3 aids in the full and complete combustion of that fluid according to this embodiment of the present invention. In another embodiment, once an initial volume of combustible fluid is ignited, the rotation of the disc pack 50 will create sufficient force to push subsequent combustible fluid volumes into ignitable contact with combustion fluid (e.g., the previously ignited combustible fluid flow) thereby continuing combustion throughout combustion chamber 3. According to yet another embodiment, once initially ignited, there is a continuous combustion of injected fuel and air in the combustion chamber 3 which is induced into a circumferential combustion flow direction about the turbine axis 61 by the tangential injection of fuel and air into the combustion chamber 3. The expanding gases resulting from the combustion are forced under pressure through CF nozzles 33 in the nozzle ring 30 to be similarly directed in the circumferential flow direction about disc pack 50.

According to an embodiment of the present invention, combustion fluid may be forced into contact with inner surface 2 due to pressure generated by the rotation of the discs 52 of disc pack 50. In one aspect of this embodiment of the present invention, combustion fluid may experience pressure from the centrifugal forces from disc pack 50 moving it distally from turbine axis 61. Centrifugal forces generated by the circumferential flow contain the combustion of the fuel adjacent inner surface 2 of the combustion chamber while the products of combustion spiral inwardly to flow between discs 52 and subsequently exit through turbine exit 8. Specifically with reference to combustion chamber section 3A, the pressure from the disc pack 50 centrifugal forces may urge the combustion fluid along the distal portions of the inner surface 2 of combustion chamber section 3A opposite nozzle ring surface 31. According to this embodiment of the present invention, maintaining combustion fluid in contact with the distal portions of the combustion chamber 3 may permit further combustion reactions to take place thereby allowing full and complete combustion of the combustion fluid in the combustion housing 3. By obtaining all the combustive output from the combustion fluid to generate rotation in the disc pack 50 (and therefore drive shaft 60), this embodiment of the present invention utilizes the combined operation of the components of turbine 100 to fully combust all entering fuel and air. According to this embodiment of the present invention, the pressure used on the combustion fluid minimizes exhaust 70 containing incompletely combusted products. According to the aforementioned embodiments of the present invention, the time of combustion of combustion fluid in combustion chamber 3 is maximized by use of centrifugal forces thereby achieving an increased number of instances of combustion along any chamber portion 3A to 3B.

Another exemplary embodiment of the present invention may include an inner surface 2 of combustion chamber 3 which has a highly emissive coating to focus the radiant heat generated during the combustion process into the center of the combustion chamber 3. Higher emissivity constants indicate a material's ability to reflect the radiation caused by convective and conductive heat streams. According to this exemplary embodiment of the present invention, highly emissive coatings, such as SiC or other such coating materials known to those skilled in the art, on inner surface 2 refocus radiant heat energies into the center of the combustion chamber 3 to provoke further combustion of the combustion fluid located therein. An additional advantage to having a highly emissive coating as it relates to this exemplary embodiment of the present invention is that it extends the life of the material comprising the combustion chamber 3 and reduces surface temperatures experienced on the walls of the combustion housing 10 defined by surfaces 1 and 2. According to another embodiment of the present invention, high emissivity may also preserve other components of turbine 100 (e.g., nozzle ring 30, discs 52 of disc pack 50 when combustion chamber 3 is integrated with nozzle ring 30, etc.).

In yet another exemplary embodiment according to the present invention of FIG. 2, the heat of inner surface 2, distal surface 31, proximal surface 32 or discs 52 may further combust the combustion fluid in its travel through turbine 100. In this embodiment of the present invention, the heated surfaces of the components of turbine 100 may be hot enough to cause successive combustion of the combustion fluid thereby creating exhaust 70 without any unused combustion products.

In another embodiment according to the present invention, a toroidal shape of combustion chamber 3 allows for the achievement of a high enough temperature to instantly combust any fuel in the chamber once the chamber has warmed up and exceeded the critical temperature to combust such fuel. A substantially round toroidal shape of inner surface 2 may have an optical focal point in the center of chamber 3 to concentrate infrared heat radiated from the chamber surface to help further combust/react fuel. In accordance with other embodiments of the present invention, the substantially round toroid of combustion chamber 3 enables combustion fluid therein to achieve high temperatures and remain within the combustion chamber 3 for an elongated period of time exposed to such high temperatures. According to these embodiments of the present invention, combustion chamber 3's shape enables substantially full and complete combustion of combustion fluid therein.

In the illustrated embodiment of FIG. 2, eight discs 52 are oriented parallel to one another so as to be perpendicular to the turbine axis 61 of the turbine shaft at evenly spaced positions in the axial direction. Although eight discs 52 are depicted according to the embodiment of FIG. 2, any plurality of discs 52 may be suitable for the disclosed embodiments of the present invention. The discs 52 may be secured together by a plurality of fasteners extending through cooperating apertures spaced circumferentially about a periphery of the discs 52 and located within each of the spokes 54 of the spacers and the discs 52. At the periphery of the discs 52 where they are maintained in a spaced apart relationship, suitable spacer washers are mounted therebetween to receive the fasteners therethrough at each of the fastener locations. All of the disc exits 56 of discs 52 are aligned with one another for communicating exhaust gases therethrough (see FIG. 3.). In conjunction with the aforementioned embodiments of the present invention, discs 52 run at such high temperatures that their surfaces may break down any contaminant on their surface allowing them to remain clean. Additionally, as mentioned with relation to other embodiments of the present invention, the high temperatures of discs 52 further combust combustion fluid entering the disc pack 50 from CF nozzle 33.

Referring to FIG. 3, the combustion of mature combustion fluid 80 may create turbulent fluid flows. According to an embodiment of the present invention in FIG. 3, turbulent combustion fluid 80 is received by distal opening 40 in nozzle ring 30. With specific attention to the nozzle ring section turning out of the page (33A), travel of combustion fluid 80 through CF nozzle 33A may redirect the combustion fluid to flow tangentially over the adjacent surfaces of disc pack 50 (similarly in the direction of fluid flow in combustion chamber 3). According to the embodiment of FIG. 3, once combustion fluid exits opening 41 of CF nozzle 33A, it flows over the surfaces of discs 52 where it may be received within discs 52 in streams 55. According to this embodiment, streams 55 may experience limited impedance in exiting turbine 100 due to a vacuum effect caused by the exiting flow of exhaust 70 through turbine exit 8. The vacuum effect created by flow of exhaust 70 through turbine exit 8 may substantially remove all pending exhaust 70 within disc exits 56 allowing for subsequent exhaust streams 70 to occupy those spaces. According to the embodiments of the present invention, the vacuum effect of exhaust 70 enables more efficient operation of turbine 100.

According to one embodiment, CF nozzles 33A and 33B promote tangential flow of combustion fluid over a certain surface area of disc pack 50. By increasing the surface area receiving the combustion fluid there over, this embodiment of the present invention achieves higher power output. According to another embodiment, CF nozzles 33A and 33B contain proximal openings 41 which aid the tangential flow of combustion fluid over a certain surface area of disc pack 50. By controlling the flow of combustion fluid out of CF nozzles 33A and 33B, proximal openings 41 may accelerate the fluid through nozzle ring 30 thereby introducing more forceful combustion fluid over discs 52 of disc pack 50 and thereby achieve higher power output. In yet another embodiment of the present invention, a combined use of CF nozzles 33A and 33B and their respective distal and proximal openings, 40 and 41 respectively, may achieve combustion fluid flows that achieve greater power output for turbine 100 (e.g., varying geometries of each to create higher accelerations of combustion fluid, greater tangential flows, etc.) The flow of gases in the tangential direction by the orientation of the CF nozzles 33 serves to drive rotation of turbine 100 by the interaction of the expanding exhaust gases through the space between discs 52. The exhaust gases spiral towards the central openings 56 in the discs 52 to be subsequently exhausted through the turbine exit 8 in chamber housing 10.

Figure 4:
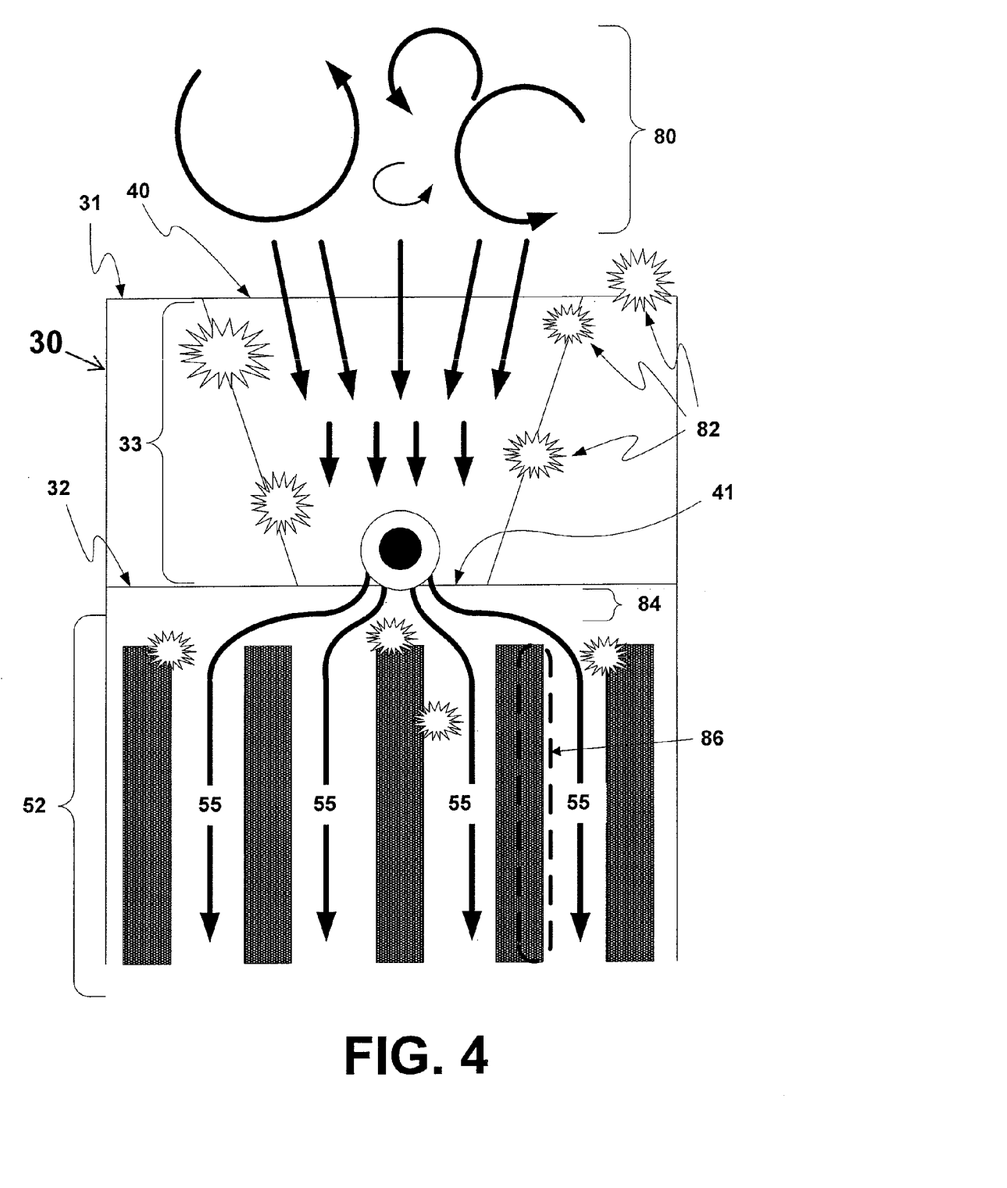
FIG. 4 illustrates a profile view of nozzle ring and disc pack according to an exemplary embodiment of the present invention.

Referring to FIG. 4, the embodiments of the present invention relating to continuous combustion of combustion fluid during turbine 100 operation may be incorporated herein. According to an exemplary embodiment of the present invention, mature combustion fluid 80 has vortices at distal surface 31. However, in this embodiment, catalytic combustions 82 may take place anywhere along nozzle ring 30 at surfaces 31, 32 or along the surface of CF nozzle 33 formed by distal and proximal openings 40 and 41, respectively. The catalytic combustions 82 of mature combustion fluid 80 may aid the full and complete combustion of the combustion fluid while creating further turbulence in the combustion fluid. According to this embodiment of the present invention, CF nozzle 33 promotes the tangential flow 84 of the mature combustion fluid 80 out of proximal opening 41. Similar to previous embodiments of the present invention, combustion fluid 84 (exiting proximal opening 41) may contact surface area 86 of discs 52 through combustion fluid streams 55. Further combustion may occur through contact of combustion fluid streams 55 over surface area 86 according to the aforementioned embodiments of the present invention. According to an exemplary embodiment of the present invention, an increased disc 52 surface area 86 provides for greater torque being produced via the boundary layer effect caused by interaction of streams 55 with discs 52. In another exemplary embodiment, increased surface area 86 promotes further complete combustion about a disc 52 in disc pack 50 using streams 55.

Figure 5A:
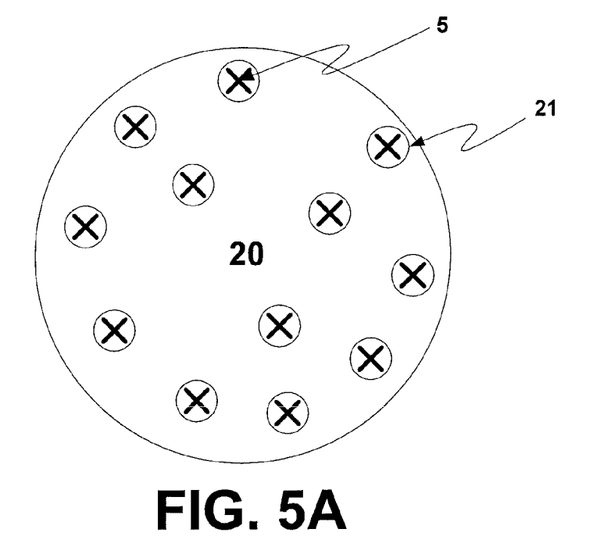
FIGS. 5A-B illustrate an air nozzle according to exemplary embodiments of the present invention.
Figure 5B:
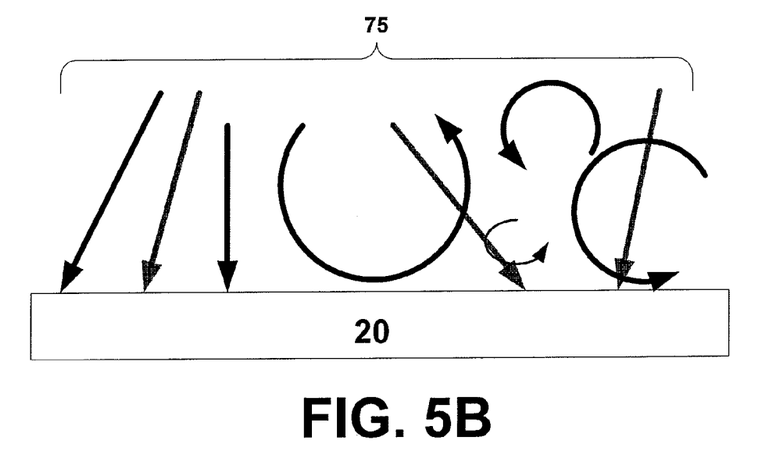

In another illustrative embodiment of the present invention, FIGS. 5A and 5B depict the external air-receiving surface of air plate 20. Air inlets 21 exist on the external air-receiving surface of air plate 20. Air inlets 21 may be arranged in any manner to receive air into turbine 100 through air channel 5. According to an embodiment of the present invention, compressed air 75 is provided in a circumferential pattern onto the air plate 20 thereby making placement of air inlets 21 preferable about that same circumference where such incoming air 75 would be incident on air plate 20. In another embodiment of the present invention, input air 75 may include vortices and eddies that create obstacles for reception of the same within air inlets 21. According to this embodiment, air inlets 21 may be placed in any arrangement on the exterior surface of air plate 20 that optimizes reception of air 75 within turbine 100.

Figure 6:
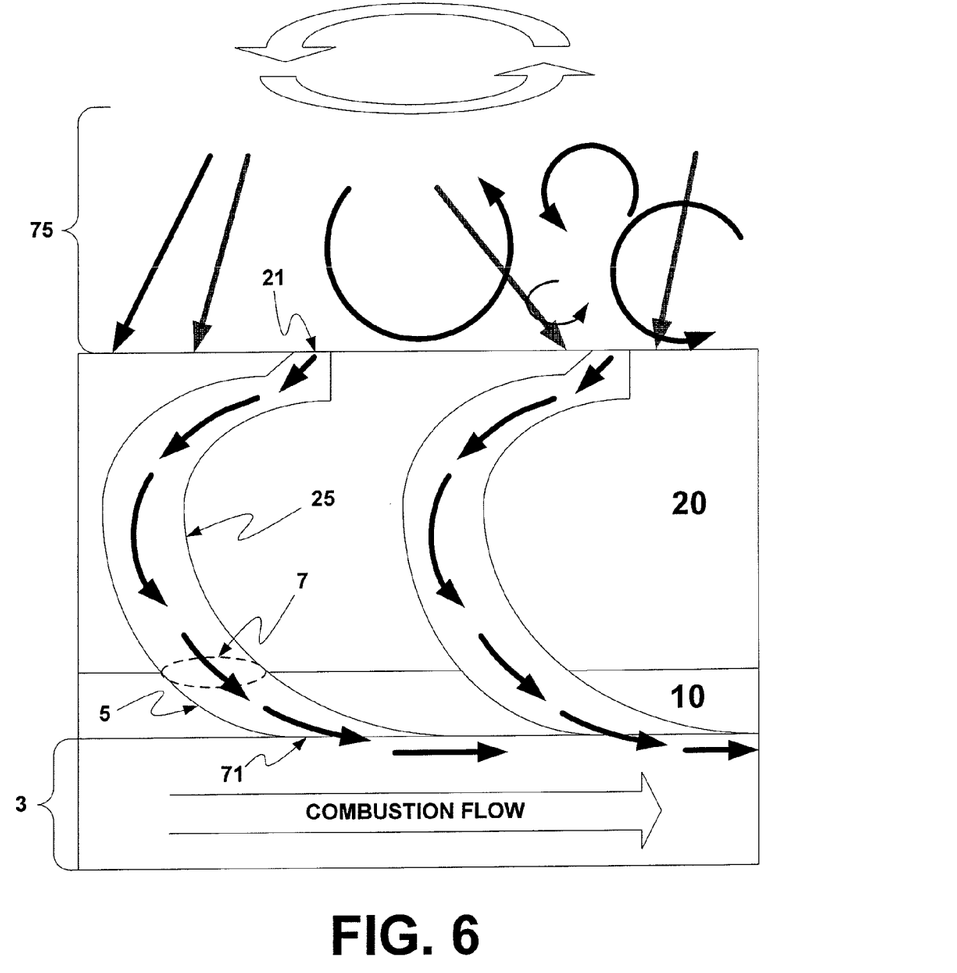
FIG. 6 illustrates a profile view of an air nozzle and combustion chamber according to an exemplary embodiment of the present invention.

FIG. 6 is a side view of air plate 20 according an exemplary embodiment of the present invention. As previously described, turbulent air 75 external to turbine 100 is incident on air plate 20. Air plate 20 may receive streams of the incoming air 75 via one or more air inlets 21. Arrows representing incoming air streams from incoming air 75 flow through air nozzle 25 through opening 7 into combustion housing 10. Once within combustion housing 10, the air streams flow through air channel 5 into combustion chamber 3 via air channel outlet 71. As previously discussed, air nozzle 25 and air channel 5 may be a single conduit for air to flow from air inlet 21 to channel outlet 71 through both the air plate 20 and combustion housing 10. According to an embodiment of the invention, air nozzle 25 may be shaped to reduce swirls and vortices in the incoming air stream 75 so that the air may exit the air nozzle substantially tangential to the combustion flow in combustion chamber 3. An air nozzle 25 according to this embodiment may be a parabolic channel or declining helical channel. Alternatively, the interactions of air nozzle 25, opening 7 and air channel 5 may act to reduce swirls and vortices in the incoming air stream 75. In this manner, momentum of the air flow exiting opening 7 in the circumferential flow direction may have been maintained in that circumferential direction through air plate 20 and into air channel 5 to increase the resultant circumferential flow of the combustion air entering the combustion chamber 3 from outlet 71.

In one embodiment, air inlet 21 includes a hemispherical groove within air plate 20 which receives air 75 that flows into the groove and slowly descends into air nozzle 25. The combined conduit of air nozzle 25, opening 7 and air channel 5 gently bends to reduce random swirls of the incoming air stream while also imparting an intended vortex air flow that may follow that of the fuel and prior combustion fluids within combustion chamber 3. In this embodiment, the incidence of flow losses caused by drastic changes in air stream direction may be avoided. In another embodiment of the present invention, air inlet 21 includes a hemispherical groove within air plate 20 whose bottom-most surface descends parabolically into air plate 20 and convenes with air nozzle 25. In that embodiment, the incoming air 75 may not experience sharp changes in direction thereby avoiding flow losses into and through combustion housing 10. Those skilled in the art will recognize numerous other air inlet shapes and forms that may reduce flow losses into and through air nozzle 25. Alternatively, those skilled in the art will recognize numerous other air inlet shapes and forms that may reduce flow losses into and through combustion housing 10.

In another embodiment, opening 7 may be shaped or formed in such a way to reduce turbulence of exiting air flows into combustion chamber 3. Those skilled in the art may understand opening 7 may have any shape or form that may reduce shock flows of air into combustion chamber 3. In one exemplary embodiment, opening 7 may be a helical ramp which gradually introduces air flowing through air nozzle 25 into combustion chamber 3.

Figure 7A:
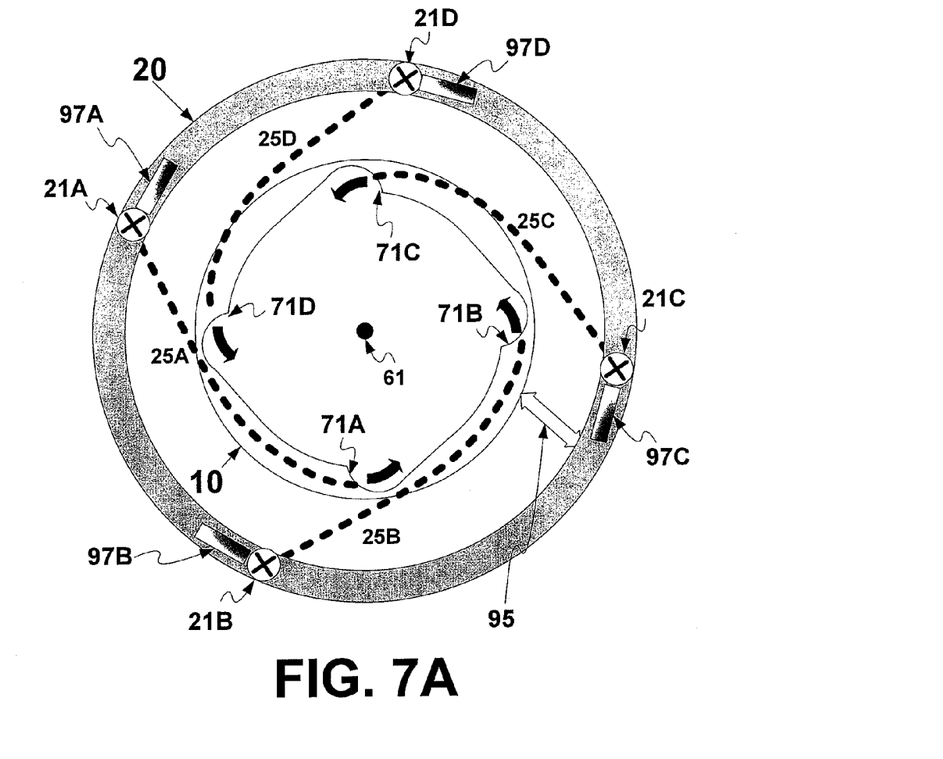
FIGS. 7A-B illustrate other exemplary embodiments of an air nozzle and combustion chamber according to the present invention.

According to the embodiments of the present invention depicted in FIG. 7A, there is an exploded view of air plate 20 and combustion housing 10 concentric with one another with turbine axis 61 as their concentric center. The exemplary embodiment of FIG. 7A depicts air plate 20 and combustion housing 10 with air inlets 21A-D, grooves 97A-D, air nozzles 25A-D and air channel outlets 71A-D, although any number of the aforementioned inlets, grooves, nozzles and outlets may be possessed by other embodiments of the present invention. According to FIG. 7A, distance 95 represents an elongated wall made by the exterior of air plate 20 and inner surface 2 of combustion housing 10. Those skilled in the art may recognize that the distance 95 is merely an aid for viewing the exploded view in FIG. 7A and is not meant to suggest any restrictive distance between air plate 20 and combustion housing 10. Those skilled in the art may understand that any distance 95 between air plate 20 and combustion housing 10 that can permit the disclosed air nozzle 25A-D functionalities would be appropriate according to these embodiments of the present invention. Thus, dashed-line paths 25A-D over wall distance 95 represent air stream passages within the air plate 20—combustion housing 10 wall.

In one embodiment of the present invention, each groove 97A-D represents an indent in air plate 20 which descends further towards combustion housing 10 as input air 75 approaches respective air inlet 21A-D. According to one embodiment, grooves 97A-D may be equal in diameter to air inlet 21A-D. Alternatively, grooves 97A-D may be any diameter permitting a geometry for receiving the incoming air 75. In another embodiment, grooves 97A-D may be partially exposed to incoming air 75 and partially submerged under the exterior air-receiving surface of air plate 20. According to that embodiment, air inlet 21A-D may also be submerged under the exterior air-receiving surface of air plate 20. According to the various embodiments of the present invention, any number of grooves 97 and air inlets 21 may be utilized to efficiently and fluidly transfer random incoming air 75 into air nozzles 25.

In one embodiment of the present invention, air nozzles 25A-D revolve about turbine axis 61 such that the exit of an air nozzle is substantially located under the inlet of another air nozzle. According to one embodiment of the present invention in FIG. 7A, air nozzle 25A allows incoming air 75 from air inlet 21A to exit at 71A which is located at substantially the same radial position as air inlet 21B. In this exemplary embodiment of the present invention, helically descending air nozzle 25A greatly reduces propensity of turbulent air 75 to exit at opening 71A into combustion chamber 3. Additionally, helically descending air nozzle 25A imparts onto air flowing therein a flow pattern substantially emulative of that experience within combustion chamber 3. According to previously described embodiments of air channels above, opening 71A may be shaped to further reduce propensity of turbulent air 75 from exiting into combustion chamber 3. Referring to those embodiments, opening 71A may be shaped or formed to minimize shock flows of air existing at the juncture of opening 71A and combustion chamber 3. In those embodiments, opening 71A may be a gradual helical ramp into combustion chamber 3. Alternatively, opening 71A may have a parabolic ramp into combustion chamber 3. Those skilled in the art would recognize opening 71A may be shaped or formed in any manner that will provide minimized shock flows of air into combustion chamber 3. Those skilled in the art would further recognize opening 71A may be shaped or formed in any manner that will reduce turbulence of incoming air 75 into combustion chamber 3. According to this exemplary embodiment, the helically descending conduit of air nozzle 25A simultaneously reduces turbulence in the incoming air stream and imparts on the air stream a vortex flow that would be substantially tangential to the combustion flow within combustion chamber 3 (referring also to FIG. 6.). As per this embodiment of the present invention, each helically descending air nozzle 25A-D is constructed to coexist throughout the wall formed between the exterior surface of air plate 20 and inner surface 2 of combustion chamber 10. In another embodiment according to the invention, air nozzles 25A-D may form substantially curved, substantially non-helical conduits which permit for greater addition of conduits in the device without impeding flow paths of prior air nozzles 25. In another embodiment according to the present invention, air nozzles 25A-D may be designed to fit substantially close to one another to simultaneously achieve desired air flows described above but avoid conduit interference.

Figure 7B:
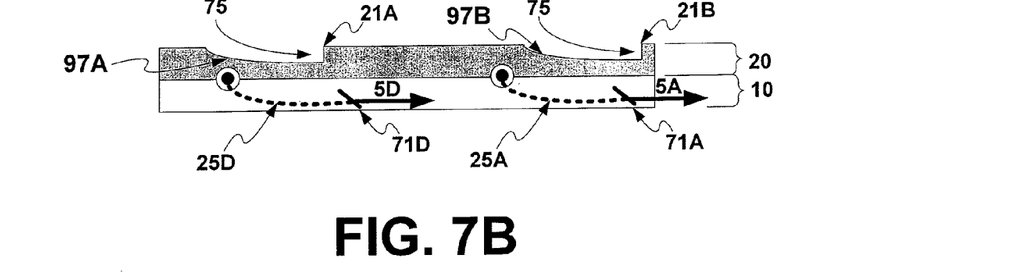

FIG. 7B is a further illustration of an exemplary embodiment according to the present invention. As described in FIG. 7A, input air 75 enters air inlet 21A over groove 97A. In one embodiment, groove 97A reduces turbulence of incoming air 75. In another embodiment, groove 97A aids in capturing random air streams on air plate 20. As depicted in the embodiment of FIG. 7B, air flow 75 entering air inlet 21A flows through the wall of air plate 20 into combustion housing 10. Once within combustion housing 10, air nozzle 25A channels the air into air channel 5A to exit into combustion chamber 3 (not shown) at opening 71A. According to this embodiment of the present invention, opening 71A is located in substantially the same location as the air inlet and groove 25B and 97B respectively. As per this embodiment, air nozzle 25A may be formed as any type of revolving conduit that would allow for exiting of input air in a direction substantially tangential to the combustion fluid flow path within combustion chamber 3. The combustion air and the fuel may then mixed directly in the combustion chamber about the full circumference of the turbine assembly as the air and fuel flow in the circumferential combustion flow direction.

An air plate 20 constructed according to the embodiments of the present invention may be made from numerous machining processes known to those skilled in the art, such as, for example, CNC machining. The air plate 20 may be formed of any material known to those skilled in the art which possesses temperature tolerances that can receive high-temperature air, for example, carbon fiber or stainless steel.

According to the embodiments of the present invention, the components comprising turbine 100 may be interchanged and exchanged according to requirements of turbine 100. Interchangeability and exchange of components of turbine 100 are made possible due to their modularity. According to one embodiment, the components may be separated at their junctures (e.g., junction between air plate 20 and combustion housing 10, disc pack 50 and combustion housing 10, etc.) to effect replacement and/or coupling of the components to additional components according to the requirements of turbine 100 (e.g., use of combustion housing 10 and disc pack 50 with a first air plate 20 to generate 50 Watts and removal of air plate 20 for a different component for use of combustion housing 10 and disc pack 50 to generate 500 Watts). Those skilled in the art would recognize numerous ways in which the various embodiments of the turbine 100 components enumerated herein can be coupled to maintain the disclosed functionalities and operations.

Many further variations and modifications will suggest themselves to those skilled in the art upon making reference to the above disclosure and foregoing illustrative embodiments, which are given by way of example only, and are not intended to limit the scope and spirit of the invention described herein.

The invention claimed is:

1. A device, comprising:
   a combustion chamber with a toroidal inner surface for receiving combusted fluid, said toroidal inner surface having at least one wall incompletely circumscribing an exhaust exit, the exhaust exit extending along a major axis of the toroidal inner surface; and
   a plurality of fuel injectors and an equal number of oxidizer inlets disposed in the combustion chamber and about the major axis, wherein each of the fuel injectors is aligned to inject combustible fluid substantially tangential to the toroidal inner surface and wherein each of the oxidizer inlets provides at least one type of oxidizer substantially tangential to the toroidal inner surface, wherein a combination of combustible fluid and at least one type of oxidizer contributes to a circumferential combustion vortex within the combustion chamber, the circumferential combustion vortex flowing around the major axis.

2. The device of claim 1, wherein said plurality of fuel injectors are circumferentially spaced.

3. The device of claim 1, wherein said combustion chamber comprises a rounded cross-section.

4. The device of claim 1, wherein said combustion chamber is a torus.

5. The device of claim 4, wherein said plurality of fuel injectors are circumferentially spaced.

6. The device of claim 1, wherein said at least one wall is configured to allow helical passage of combusted product from said combustion chamber to said exhaust exit.

7. The device of claim 1, further comprising catalytic combustion means.

8. The device of claim 2 further comprising catalytic combustion means.

9. The device of claim 3 further comprising catalytic combustion means.

10. The device of claim 4 further comprising catalytic combustion means.

11. The device of claim 5 further comprising catalytic combustion means.

12. The device of claim 6 further comprising catalytic combustion means.

13. The device of claim 4, wherein said at least one wall is configured to allow helical passage of combusted product from said combustion chamber to said exhaust exit.

14. The device of claim 4, wherein said plurality of fuel injectors are circumferentially spaced.

15. The device according to claim 13, further comprising catalytic combustion means.

16. The device according to claim 14, further comprising catalytic combustion means.

17. The device of claim 1, wherein each of the plurality of fuel injectors and oxidizer inlets alternate circumferentially about the combustion chamber.

18. The device according to claim 4, wherein each of the plurality of fuel injectors and oxidizer inlets alternate circumferentially about the combustion chamber.

19. The device according to claim 5, wherein each of the plurality of fuel injectors and oxidizer inlets alternate circumferentially about the combustion chamber.

20. The device according to claim 1, wherein the combustion chamber is coupled to an annular plate with spiral channels wherein the combustion chamber shares substantially the same major axis with the plate.

21. (The device according to claim 2, wherein the combustion chamber is coupled to an annular plate with spiral channels wherein the combustion chamber shares substantially the same major axis with the plate.

22. The device according to claim 3, wherein the combustion chamber is coupled to an annular plate with spiral channels wherein the combustion chamber shares substantially the same major axis with the plate.

23. The device according to claim 4, wherein the combustion chamber is coupled to an annular plate with spiral channels wherein the combustion chamber shares substantially the same major axis with the plate.

24. The device according to claim 5, wherein the combustion chamber is coupled to an annular plate with spiral channels wherein the combustion chamber shares substantially the same major axis with the plate.

25. The device according to claim 6, wherein the combustion chamber is coupled to an annular plate with spiral channels wherein the combustion chamber shares substantially the same major axis with the plate.

26. The device according to claim 7, wherein the combustion chamber is coupled to an annular plate with spiral channels wherein the combustion chamber shares substantially the same major axis with the plate.

27. The device according to claim 5, wherein a vacuum exists at the exhaust exit.

28. The device according to claim 6, wherein a vacuum exists at the exhaust exit.

29. The device according to claim 7, wherein a vacuum exists at the exhaust exit.

30. The device of claim 1, further comprising a plurality of centrally-located discs coupled to a shaft circumscribed by said combustion chamber.

31. A device, comprising:
    a toroidal chamber;
    a plurality of fuel injectors and an equal number of oxidizer inlets each circumferentially arranged about the toroidal chamber, the plurality of fuel injectors being aligned to inject combustible fluid substantially tangential to a wall of said toroidal chamber and the equal number of oxidizer inlets being aligned to supply at least one type of oxidizer substantially tangential to a wall of said toroidal chamber, the combustion of the combustible fluid and at least one type of oxidizer generating a circumferential combustion vortex within said toroidal chamber; and
    an exhaust exit disposed radially inward of the toroidal chamber.

32. The device of claim 31, wherein said toroidal chamber is a torus.

33. The device of claim 31, wherein said toroidal chamber comprises a rounded cross-section.

34. The device of claim 31, further comprising catalytic combustion means.

35. The device of claim 31, further comprising a material selected from the group consisting of SiC, SiN, alumina, graphite, technical ceramics, and combinations thereof.

36. The device according to claim 31, further comprising catalytic combustion means.

37. The device according to claims 32, further comprising catalytic combustion means.

38. The device according to claims 33, further comprising catalytic combustion means.

39. The device according to claims 35, further comprising catalytic combustion means.

40. The device of claim 32, further comprising a material selected from the group consisting of SiC, SiN, alumina, graphite, technical ceramics, and combinations thereof.

41. The device of claim 33, wherein said toroidal chamber is a torus.

42. The device of claim 34, wherein said toroidal chamber is a torus.

43. The device of claim 35, wherein said toroidal chamber is a torus.

44. The device of claim 33, further comprising a material selected from the group consisting of SiC, SiN, alumina, graphite, technical ceramics, and combinations thereof.

45. The device of claim 34, further comprising a material selected from the group consisting of SiC, SiN, alumina, graphite, technical ceramics, and combinations thereof.

46. The device of claim 36, wherein the catalytic combustion means include a high emissivity coating within the toroidal chamber.

47. The device according to claim 31, wherein the toroidal chamber is coupled to an annular plate with spiral channels wherein the toroidal chamber shares substantially the same major axis with the annular plate.

48. The device according to claim 32, wherein the toroidal chamber is coupled to an annular plate with spiral channels wherein the toroidal chamber shares substantially the same major axis with the annular plate.

49. The device according to claim 33, wherein the toroidal chamber is coupled to an annular plate with spiral channels wherein the toroidal chamber is substantially coaxial with the annular plate.

50. The device according to claim 34, wherein the toroidal chamber is coupled to an annular plate with spiral channels wherein the toroidal chamber is substantially coaxial with the annular plate.

51. The device according to claim 35, wherein the toroidal chamber is coupled to an annular plate with spiral channels wherein the toroidal chamber is substantially coaxial with the annular plate.

52. The device of claim 36, wherein the toroidal chamber is coupled to an annular plate with spiral channels wherein the toroidal chamber is substantially coaxial with the annular plate.

53. The device of claim 41, wherein the toroidal chamber is coupled to an annular plate with spiral channels wherein the toroidal chamber is substantially coaxial with the annular plate.

54. The device of claim 42, wherein the toroidal chamber is coupled to an annular plate with spiral channels wherein the toroidal chamber is substantially coaxial with the annular plate.

55. The device of claim 31, further comprising a plurality of centrally-located discs coupled to a shaft circumscribed by said toroidal chamber.

56. A method for combusting fluid, comprising the steps of:
injecting a combustible fluid substantially tangential to a wall of a toroidal chamber via a plurality of circumferentially spaced fuel injectors;
providing at least one oxidizer substantially tangential to the wall of the toroidal chamber via a plurality of circumferentially spaced oxidizer inlets, wherein there are an equal number of oxidizer inlets and fuel injectors;
generating a circumferential combustion vortex within said toroidal chamber; expelling exhaust from combustion of said combustible fluid via a nozzle ring to a centrally-located exit of said toroidal chamber, wherein the nozzle ring and exit are radially inward of the toroidal chamber.

57. The method of claim 56, further comprising the step of substantially eliminating all combustible fluid from said exhaust.

58. The method of claim 56, further comprising radiating combustible fluid using said toroidal chamber.

59. The method of claim 56, wherein said injecting step takes place after said generating step.

60. The method of claim 56, further comprising the step of helically exhausting combusted fluid through a plurality of centrally-located discs coupled to a shaft circumscribed by said toroidal chamber.

61. The method of claim 60, wherein the step of helically exhausting combusted fluid through said plurality of centrally-located discs coupled to said shaft rotates said shaft.

62. The method of claim 58, further comprising the step of substantially eliminating all combustible fluid from said exhaust.

63. The method of claim 57, further comprising radiating combustible fluid using said toroidal chamber.

64. The method of claim 57, wherein said injecting step takes place after said generating step.

65. The method of claim 58, wherein said injecting step takes place after said generating step.

66. The method of claim 59, further comprising radiating combustible fluid using said toroidal chamber.

67. The method of claim 62, further comprising the step of helically exhausting combusted fluid through a plurality of centrally-located discs coupled to a shaft circumscribed by said toroidal chamber.

68. The method of claim 63, further comprising the step of helically exhausting combusted fluid through a plurality of centrally-located discs coupled to a shaft circumscribed by said toroidal chamber.

69. The method of claim 64, further comprising the step of helically exhausting combusted fluid through a plurality of centrally-located discs coupled to a shaft circumscribed by said toroidal chamber.

70. The method of claim 65, further comprising the step of helically exhausting combusted fluid through a plurality of centrally-located discs coupled to a shaft circumscribed by said toroidal chamber.

71. The method of claim 66, further comprising the step of helically exhausting combusted fluid through a plurality of centrally-located discs coupled to a shaft circumscribed by said toroidal chamber.

* * * * *